United States Patent [19]

Spry

[11] Patent Number: 5,270,872
[45] Date of Patent: Dec. 14, 1993

[54] SUPERCONDUCTING SUBMICRON FILTER

[75] Inventor: Robert J. Spry, Tipp City, Ohio

[73] Assignee: The United States of America as represented by the Secretary of the Air Force, Washington, D.C.

[21] Appl. No.: 386,799

[22] Filed: Jul. 20, 1989

[51] Int. Cl.[5] .......................... G02B 5/24; H01C 7/16
[52] U.S. Cl. ..................................... 359/885; 356/234
[58] Field of Search ............... 350/314, 317, 353, 385, 350/362; 332/7.51; 357/4; 359/885; 356/234; 505/848

[56] References Cited

U.S. PATENT DOCUMENTS

| | | |
|---|---|---|
| H39 | 3/1986 | Gubser et al. . |
| 3,594,065 | 7/1971 | Marks .................... 350/362 |
| 3,623,795 | 11/1971 | Taylor et al. . |
| 3,773,684 | 11/1973 | Marks . |
| 3,790,250 | 2/1974 | Mitchell et al. . |
| 3,818,390 | 6/1974 | Gikow et al. . |
| 3,857,114 | 12/1974 | Minet et al. . |
| 3,956,727 | 5/1976 | Wolf . |
| 4,057,326 | 11/1977 | Knop .................... 350/314 |
| 4,093,353 | 6/1978 | Lang . |
| 4,099,854 | 7/1978 | Decker et al. . |
| 4,114,985 | 9/1978 | Friedman . |
| 4,180,605 | 12/1979 | Gilbert et al. . |
| 4,261,331 | 4/1981 | Stephens . |
| 4,261,653 | 4/1981 | Goodrich .................... 350/362 |
| 4,307,942 | 12/1981 | Chahroudi . |
| 4,499,441 | 2/1985 | Lynch et al. . |
| 4,521,682 | 6/1985 | Murakami et al. . |
| 4,566,031 | 1/1986 | Kirk .................... 350/362 |
| 4,657,345 | 4/1987 | Gordon . |
| 4,713,795 | 12/1987 | Woike et al. . |
| 4,719,342 | 1/1988 | Cohn et al. . |
| 4,737,000 | 4/1988 | Garlick et al. . |
| 4,754,384 | 6/1988 | Levy et al. . |

FOREIGN PATENT DOCUMENTS 2027925  2/1980  United Kingdom ................ 350/314

Primary Examiner—Nelson Moskowitz
Attorney, Agent, or Firm—Bobby D. Scearce; Donald J. Singer

[57] ABSTRACT

An optical filter structure for selectively blocking radiation of predetermined wavelength is described which comprises a layer of material characterized by transition from a superconducting phase to insulating phase upon heating to a characteristic transition temperature, deposited on a slab of dielectric material in the form of a plurality of multipole elements in a planar array of predetermined spacing of optical dimensions between adjacent rows and columns of said array.

13 Claims, 2 Drawing Sheets

SUPERCONDUCTING SUBMICRON FILTER

RIGHTS OF THE GOVERNMENT

The invention described herein may be manufactured and used by or for the Government of the United States for all governmental purposes without the payment of any royalty.

CROSS-REFERENCE TO RELATED APPLICATIONS

The invention described herein is related to copending application Ser. No. 07/172,119 filed Feb. 23, 1984, entitled "Inorganic Filter"; Ser. No. 06/841,389 filed Mar. 5, 1986, entitled "Reflection Filter"; Ser. No. 06/841,388 filed Mar. 5, 1986, entitled "Searching Filter", Ser. No. 07/386,796 filed Jul. 20, 1989, entitled "Superconducting Reflection Filter" and Ser. No. 07/386,798 filed Jul. 20, 1989, entitled "Superconducting Searching Filter", each of which have the same assignee as that of the present application.

BACKGROUND OF THE INVENTION

The present invention relates generally to laser hardened materials and structures, and more particularly to a novel optical filter structure for selectively blocking laser radiation of predetermined wavelength while passing radiation of other wavelengths.

Optical switching devices comprising transition or switching materials which are optically transparent in one state but which transform to an opaque metallic state when heated to a characteristic transition temperature are well developed for applications such as optical filters, modulators, laser output couplers, and the like. These devices are generally characterized by transition from substantial transparency below the characteristic transition temperature to substantial opacity above that temperature at all wavelengths.

In accordance with the teachings of copending application Ser. No. 07/172,119, which teachings are incorporated herein by reference, an optical filter structure was described for selectively blocking radiation of predetermined wavelength comprising a layer of material characterized by transition from non-metal to metal, corresponding to a change from transmissive to reflective states upon being heated to a characteristic transition temperature, deposited on a slab of dielectric material in the form of a plurality of multipole elements in an array of predetermined spacing between adjacent rows and columns of the array. The filter of the Ser. No. 07/172,119 application is characterized by substantial transparency to all radiation wavelengths below its characteristic transition temperature, and opacity only to the predetermined wavelength, and substantial transparency to all other wavelengths, above the transition temperature, and is constructed by applying a film of thermal switching material in the form of an array of microwave-type multipole elements of optical dimensions, the film being applied to a dielectric slab, or sandwiched between two dielectric slabs.

For purposes of describing the invention and defining the scope thereof, the term "optical" shall, in accordance with the customary usage, be defined herein to include only ultraviolet, visible, near infrared, mid-infrared and far infrared regions of the electromagnetic spectrum lying between about 0.1 to about 1000 microns (see e.g. *Optical Physics*, by Max Garbuny, Academic press, New York, 1965, pp 1–6). and more specifically to the range of from about 0.2 micron, the approximate lower limit of operation of fine quality quartz lenses (Garbuny, p 280), to about 50 microns, the approximate upper limit of operation of long wavelength transmitting material such as KRS-5 (thallium bromide-iodide ionic crystal) (Garbuny, p 282).

The invention provides a novel optical reflection band filter which switches from a reflective state to a transmissive state upon being heated to a transition temperature following absorption of a certain amount of laser radiation. The filter is constructed by applying films of high-temperature superconducting materials in the form of an array of microwave type multipole elements of optical dimensions applied to a dielectric slab or sandwiched between two dielectric slabs.

The switching materials operate by undergoing a superconducting-to-insulating transition at the characteristic temperature. The invention therefore is a substantial improvement over the totally opaque switching reflection filter, the non-switching metallic element array reflection-band filter, and other wavelength responsive laser hardening devices.

It is therefore a principal object of the invention to provide an improved optical filter.

It is a further object of the invention to provide an optical filter for selectively blocking laser radiation of selected wavelength while passing radiation of substantially all other wavelengths.

It is yet a further object of the invention to provide a switchable filter incorporating insulating-to-superconducting materials to provide selective wavelength filtering.

It is yet another object of the invention to provide an optical filter having fast response time.

These and other objects of the invention will become apparent as the detailed description of representative embodiments proceeds.

SUMMARY OF THE INVENTION

In accordance with the foregoing principles and objects of the invention, an optical filter structure for selectively blocking radiation of predetermined wavelength is described which comprises a layer of material characterized by transition from a superconducting phase to insulating phase upon heating to a characteristic transition temperature, deposited on a slab of dielectric material in the form of a plurality of multipole elements in a planar array of predetermined spacing of optical dimensions between adjacent rows and columns of said array.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
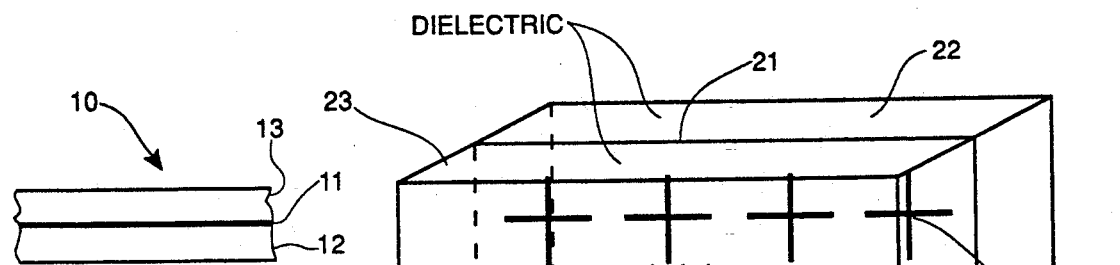
FIG. 1 is a fragmentary sectional view of a layered structure of the present invention.
Figure 2:
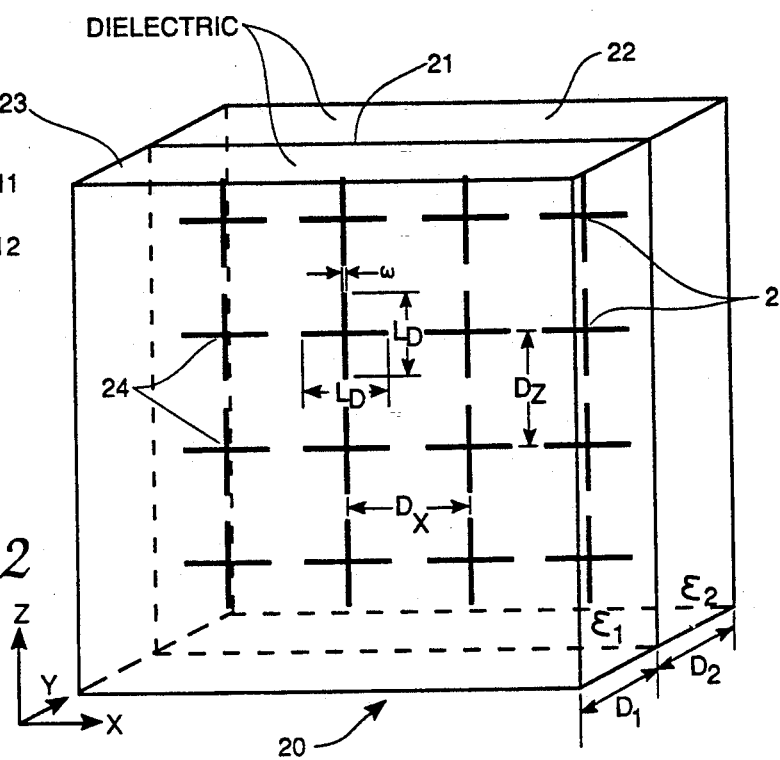
FIG. 2 is a perspective view of a layered structure of one embodiment of the invention incorporating an array of crossed dipoles as the transition layers.
Figure 3:
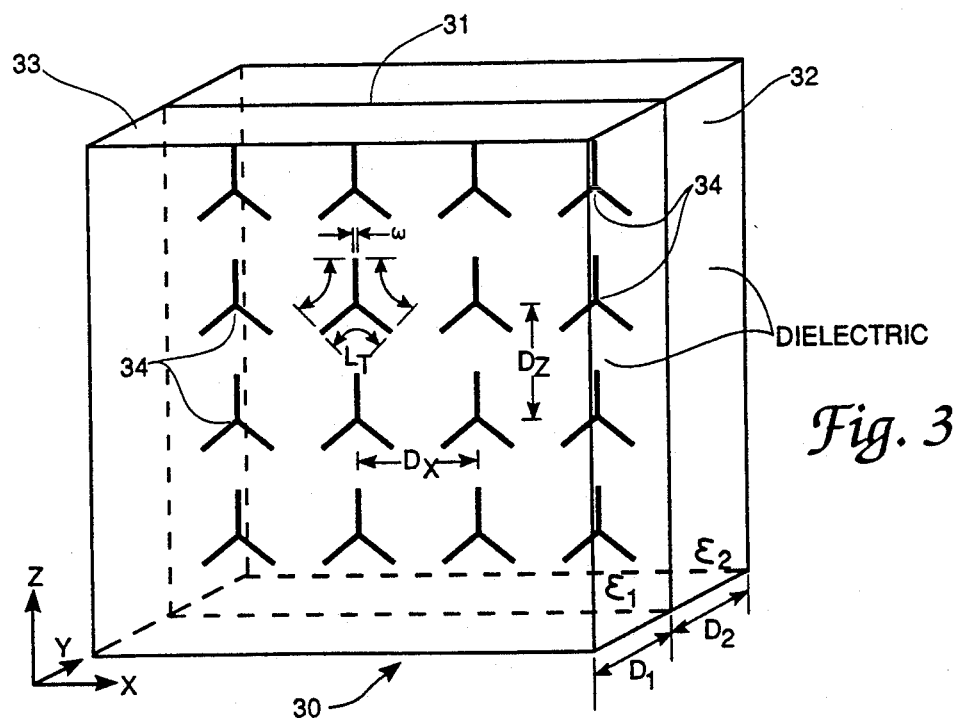
FIG. 3 is a perspective view of a layered structure of another embodiment of the invention incorporating an array of tripoles as the transition layer.

Referring now to FIGS. 1-3, shown therein are layered structures including dipole and tripole elements and representative of arrays which may be deposited according to the teachings of the invention. As shown in FIG. 1, reflection filter 10 of the invention may comprise layer 11 of an array of elements deposited in predetermined pattern and spacing as herein described on a supporting substrate 12 of dielectric material. A second slab or layer 13 of dielectric material may be applied over layer 11 to form the sandwich structure shown, if desired. Dielectric substrate 12 or slab 13 may include semiconductors, ionic crystals, covalent crystals, glasses, polycrystalline materials, amorphous materials, polymers and other organic materials, all generally characterized as transparent insulators or semiconductors, substantially transparent to optical wavelengths in the region from about 0.2 to 50.0 microns.

Layer 11 comprises a periodic array of microwave antenna type multipole element of novel structure deposited on substrate 12. As shown in FIGS. 2 and 3, layer 21, 31 comprising representative arrays of multipole elements of respective filters 20, 30 may comprise a rectilinear, square array of crossed dipoles 24 or tripoles 34, respectively deposited on substrates 22, 32 of substantially transparent dielectric material of dielectric constant $\epsilon_2$, and covered by optional slabs 23, 33 of dielectric material of dielectric constant $\epsilon_1$. Layers 21, 31 of filters 20, 30 may be otherwise configured, within the scope of these teachings, in other geometric forms, and may include single dipoles, grids, crosses, circles, and staggered multipole patterns, as might occur to one with skill in the field of the invention. Further, selected multipole patterns may be deposited to any desired thickness as appropriate, in any periodic array and orientation with respect to each other, within the contemplation of the teachings herein, as to define hexagonal, diamond, circular or other desired pattern as a particular application requires.

The multipole elements (i.e. crossed dipoles 24 or tripoles 34) of layer 11, 21, 31 comprise a material which undergoes a superconducting to insulating phase transition upon heating to a relatively high critical temperature $T_c$. These materials may include, but are not necessarily limited to, ceramics, such as the Ba-La-Cu-0 system including $Ba_xLa_{5-x}Cu_5O_{5(3-y)}$, $Ba_xLa_{1-x}CuO_{3-y}$, and $Ba_xLa_{2-x}CuO_{4-y}$; the Sr-La-Cu-O system including $Sr_xLa_{2-x}CuO_{4-y}$ and $(Sr_xLa_{1-x})_2CuO_{4-x}$; the Y-Ba-Cu-O system including $YBa_2Cu_3O_{9-y}$ and $Y_{0.87}Ba_{1.53}Cu_3O_y$; the Ba-Sr-La-Cu-O system including $(Ba, Sr)_x La_{2-x}CuO_{4-y}$; the La-Cu-O system including $La_2CuO_4$; and the Ba-Pb-Bi-O system including the $Bapb_{1-}Bi_xO_3$, and organic semiconductors such as copper-doped, silver-doped or gold-doped tetracyanoquinodimethane (TCNQ). Insulating-to-superconducting transition temperatures $T_C$ range from about 0.3° to 120° K. The multipoles may be deposited using substantially standard deposition techniques including x-ray, electron beam or ion beam lithography, photolithography, or other appropriate techniques as would occur to one with skill in the applicable art. X-ray lithography may offer optimum resolution. The resulting structure may, as mentioned above, be covered with a covering layer of dielectric material of dielectric constant $\epsilon_1$ (e.g., slab 23 of FIG. 2 or slab 33 of FIG. 3) although the structure may be used as an operative optical filter without the second (covering) dielectric slab.

Referring now again to FIGS. 2 and 3, crossed dipoles 24 of layer 21 of FIG. 2 lie in the x-z plane coincident with layer 21. Dipoles 24 are separated by distances of optical dimensions designated by $D_x$ between adjacent columns and $D_z$ between adjacent rows and have predetermined overall length $L_D$ and width w. Dielectric substrate 22 has thickness $D_2$ and dielectric constant $\epsilon_2$, and slab 23 has thickness $D_1$ and dielectric constant $\epsilon_1$, and each are preferably transparent to radiation over substantially all wavelengths of interest. Therefore, light traveling, for example, along the Y coordinate impinges first upon dielectic 23. The area of each crossed dipole is given $2wL_D$ and the fractional cross-sectional area $R_d$ occupied by the crossed dipoles 24 may be expressed as, $$R_d = 2wL_D/D_xD_z \quad (1)$$

For the FIG. 3 configuration comprising tripoles 34, a similar analysis applies The area of each tripole 34 may be expressed as $3wL_T/2$, and the fractional cross section $R_t$ occupied by tri-poles 34 may be expressed as, $$R_t = 3wL_T/2D_xD_z \quad (2)$$

Similar analysis may be performed to obtain equivalent expressions for R for multipole elements in other configurations.

At a temperature below $T_C$, the elements behave as metallic periodic antenna arrays. These periodic arrays are known to produce reflection bands of 93%-97% reflection about a central wavelength $\lambda_0$. The width of the reflection band may be tailored by choosing the proper dimensions of the multipole elements. The exact details of the calculation of the peak value of the reflection band are exceedingly complex and can only be evaluated numerically. In addition, final fine tuning of the reflection band is an empirical process in most cases. For these reasons, calculations of the last few percent reflectivity are beyond the scope of this disclosure.

Due to the imperfect nature of the multipole elements, and of the substrate and dielectric layers, the filter continues to absorb laser radiation until it reaches the temperature $T_C$. The multipole elements switch from a superconducting to a resistive state at this temperature.

Above temperature $T_C$, the filter is transparent to all wavelengths of incoming radiation. The only absorption is that by non-metallic materials of the crossed-dipole and tripole elements. Assuming total absorption by these elements, and neglecting reflection losses of the slabs which are small and can be overcome by anti-reflection coatings, the optical absorption is given by Eqs (1) and (2). When the filter is at a temperature below $T_C$, the relationship between the resonant wavelengths and the physical dimensions of the multipole elements, may be calculated by the following considerations. The size of the elements of the crossed dipoles are obtained by:

$$L_D \approx 0.5\lambda_0/N_{\text{eff}} \quad (3)$$

and for tripoles by $$L_T \approx 0.55(\lambda_0/N_{\text{eff}}) \quad (4)$$

where $N_{\text{eff}}$ is the effective index of refraction given by, $$N_{eff} = \left( \frac{\epsilon_1 + \epsilon_2}{2} \right)^{\frac{1}{2}} \quad (5)$$

where each respective dielectric constant is effectively equal to the square of the corresponding material refractive index. Thus, the product of element length times effective refractive index may lie in the range of about 0.1 micron to about 25 microns.

$L_D$ and $L_T$ being given, the other dimensions of the multi-pole are selected. The spacing between rows and columns is kept below $\lambda_0/2$ to avoid grating lobes, but the spacing must be chosen large enough that adjacent elements do not touch. A best estimate of minimum spacing may be a value greater than about one-tenth the length of the elements (i.e., about one-twentieth the design wavelength). In most cases this implies, $$D_x = D_z \approx L_D \text{ or } L_T \quad (6)$$

The size of w affects the width of the reflection band, which is a function of w/l. The exact mathematical dependence is exceedingly complicated, but the reflection bandwidth increases with increasing element width. The element width parameter is best determined empirically, a major consideration being the transmission required at temperatures above $T_C$, as governed by Eqs (1) and (2).

Consider an example that a filter of the crossed dipole array configuration of FIG. 2 is required to reflect 10 micron laser radiation. A dielectric slab 22 of ZnS (refractive index = 2.25) may be selected. Assume no covering slab 23 is used (i.e., $\epsilon_1 = 1.0$). From Eq (5), $$N_{eff} = \left( \frac{1 + (2.25)^2}{2} \right)^{\frac{1}{2}} = 1.74.$$

and from Eq (3), $$L_D = 0.5 \left( \frac{10 \text{ microns}}{N_{eff}} \right) = 2.87 \text{ microns}.$$

Allowing $D_x = D_z = 3.02$ microns, satisfies the requirement that $D_x$ and $D_z$ are less than $\lambda_0/2$ and ensures that the elements 24 in adjacent rows and columns do not touch. The value for w is determined empirically to obtain the desired bandwidth, but some limitations are imposed by the inband absorption to be tolerated above the critical temperature. For w = 0.2 micron, the absorption Ab calculated from the expression of Eq (1) for $R_d$ is, $$Ab = R_d = \frac{(2)(0.2 \text{ microns})(2.87 \text{ microns})}{(3.02 \text{ microns})^2} = 0.126$$

or about 13%. Thus, a trade-off is to be made among the bandwidth, the transmission of the unswitched state filter, and the limitations of present lithographic techniques.

Figure 4A:
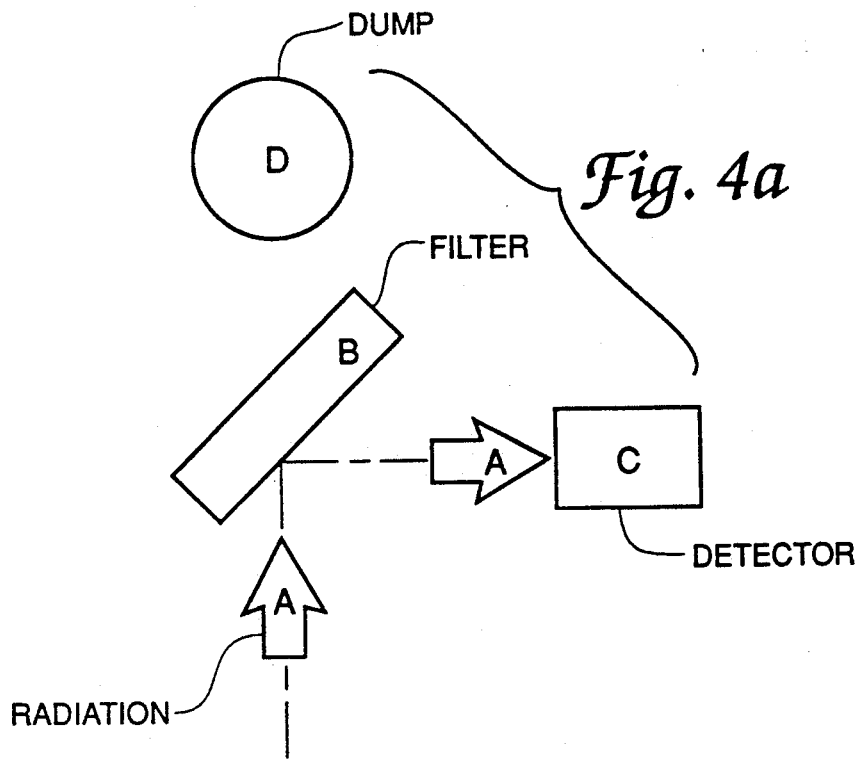
FIGS. 4a and 4b are schematic diagrams of the functional operation of the invention.
Figure 4B:
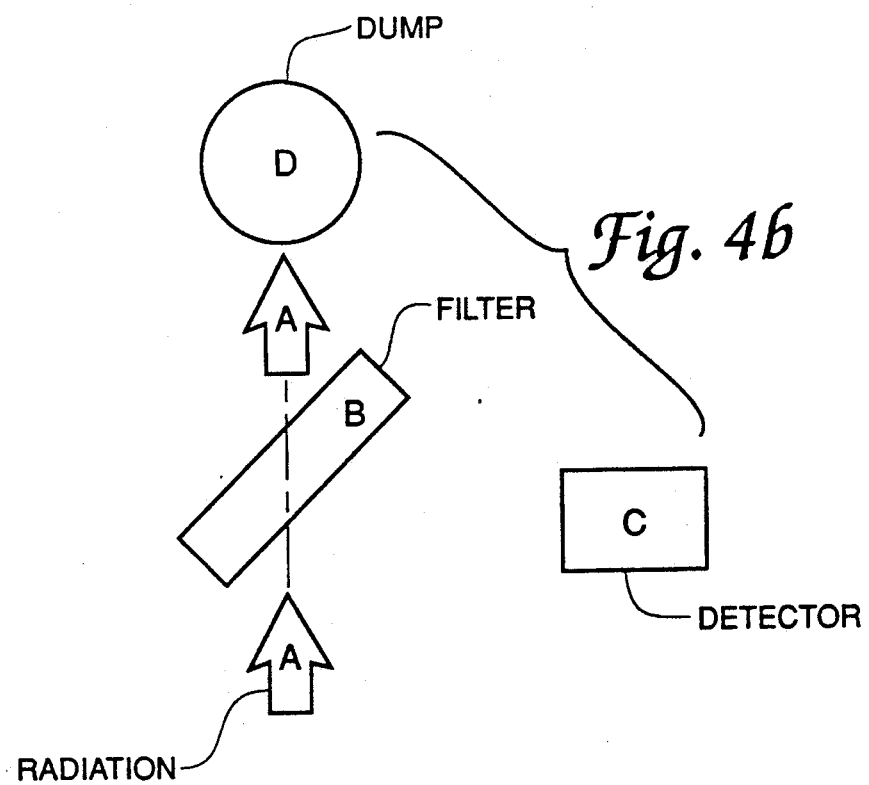

An application of the filter for laser hardening is illustrated in FIG. 4. In FIG. 4, the filter is held in the superconducting state by thermal bias at a temperature slightly below temperature $T_C$. Incoming radiation A is reflected by filter B to detector C. The reflection band of the filter may be either narrow-band or broad-band depending on the particular optical system being protected. If the intensity A becomes intense, such as caused by a laser whose wavelengths $\lambda_0$ lies within the reflection-band of filter B, the temperature of filter B increases until it is greater than temperature $T_C$ (FIG. 4b). The filter no longer reflects radiation, which is now diverted to optical dump D, thus protecting detector C.

The invention therefore provides an optical filter for blocking radiation within a stopband centered about a preselected wavelength while passing other wavelengths. The response of the filter is wavelength independent after switching, and absorption losses (less than about 10-15% due mostly to geometry of the array elements) are minimized due to the switching mechanism which characterizes operation of the filter. Because of the small thermal mass and thermal isolation of the transition segments, the invention has a time constant for switching substantially faster than that for existing devices, characterized by opaque switching or by fixed wavelength switching the invention may comprise may comprise optical substrates configured in substantially any size and shape, and may be effective in its function at angles of incidence of impinging radiation up to about 80° from normal. The invention may therefore find substantial use as a protective optical filter against laser weapons.

It is understood that modifications to the invention may be made, as might occur to one with skill in the field of the invention, within the scope of the appended claims. All embodiments contemplated hereunder which achieve the objects of the invention have therefore not been shown in complete detail. Other embodiments may be developed without departing from spirit of the invention or from the scope of the appended claims.

I claim:
1. An optical filter structure for selectively blocking radiation of preselected optical wavelength within a wavelength range, comprising:
   (a) a first layer of dielectric material substantially transparent to wavelengths within said range; and
   (b) a layer of transition material deposited on said first dielectric layer, said transition material characterized by a transition from superconducting phase to insulating phase upon being heated to a characteristic transition temperature;
   (c) said layer of transition material defining a plurality of distinct antenna-type multipole elements each having length approximately equal to one-half said preselected wavelength and arranged in a substantially planar array of spacing between adjacent elements of size sufficient that adjacent elements do not touch and of size less than about one-half said preselected wavelength.

2. The filter structure of claim 1 wherein said planar array is rectangular and the multipole elements are deposited with said spacing between adjacent rows and columns of said elements.

3. The filter structure of claim 1 further comprising a second layer of dielectric material substantially transparent to wavelengths within said range covering said plurality of multipole elements.

4. The filter structure of claim 1 wherein said periodic array is rectangular with predetermined spacing between adjacent rows and columns.

5. The filter structure of claim 1 wherein said periodic array is hexagonal.

6. The filter structure of claim 1 further comprising a second layer of dielectric material covering said array.

7. The filter structure of claim 1 wherein said transition material comprises a ceramic.

8. The filter structure of claim 7 wherein said ceramic is a barium-lanthanum-copper oxide.

9. The filter structure of claim 7 wherein said ceramic is a strontium-lanthanum-copper oxide.

10. The filter structure of claim 7 wherein said ceramic is a yttrium-barium-copper oxide.

11. The filter structure of claim 1 wherein said transition material is tetracyanoquinodimethane doped with a metal selected from the group consisting of copper, silver and gold.

12. The filter structure of claim 1 wherein said plurality of multipole elements comprise crossed dipoles.

13. The filter structure of claim 1 wherein said plurality of multipole elements comprise tripoles.

* * * * *